US009521227B2

(12) United States Patent
Kim

(10) Patent No.: US 9,521,227 B2
(45) Date of Patent: Dec. 13, 2016

(54) CABLE-WITHDRAWING ASSEMBLY

(71) Applicant: Kum Oh Electronics CO., LTD., Bucheon-si (KR)

(72) Inventor: Ki Sang Kim, Bucheon-si (KR)

(73) Assignee: KUM OH ELECTRONICS CO., LTD. (KR)

( * ) Notice: Subject to any disclaimer, the term of this patent is extended or adjusted under 35 U.S.C. 154(b) by 0 days.

(21) Appl. No.: 14/800,944

(22) Filed: Jul. 16, 2015

(65) Prior Publication Data

US 2016/0100041 A1 Apr. 7, 2016

(30) Foreign Application Priority Data

Oct. 1, 2014 (KR) .................. 10-2014-0132526
Jun. 18, 2015 (KR) .................. 10-2015-0086452

(51) Int. Cl.
| | | |
|---|---|---|
| *H04M 1/15* | (2006.01) | |
| *H02G 11/02* | (2006.01) | |
| *A47F 7/024* | (2006.01) | |
| *G08B 13/14* | (2006.01) | |
| *H02G 3/18* | (2006.01) | |
| *H01R 13/72* | (2006.01) | |
| *A47B 21/06* | (2006.01) | |
| *H02G 3/22* | (2006.01) | |

(52) U.S. Cl.
CPC .............. *H04M 1/15* (2013.01); *A47F 7/024* (2013.01); *G08B 13/1409* (2013.01); *G08B 13/1463* (2013.01); *H02G 3/185* (2013.01); *H02G 11/02* (2013.01); *A47B 21/06* (2013.01); *H01R 13/72* (2013.01); *H02G 3/22* (2013.01); *H02G 2200/10* (2013.01)

(58) Field of Classification Search
CPC .... H04M 1/15; H04M 1/0258; H04M 1/6058; H02G 3/185; H02G 3/22; H02G 2200/10; H02G 11/02; H02G 11/006; A47F 7/024; A47F 3/002; A47F 7/00; G08B 13/1409; G08B 13/1445; G08B 13/1463; G08B 13/2434; A47B 21/06; H01R 13/72; E05B 73/0029; B65H 2701/34; B65H 2701/391; B65H 75/48; B65H 75/34; B65H 75/362; B65H 75/364; B65H 75/446; B65H 75/4484
USPC .......................................... 191/12.2 R, 12.4
See application file for complete search history.

(56) References Cited

U.S. PATENT DOCUMENTS

| | | | | | |
|---|---|---|---|---|---|
| 3,854,017 | A | * | 12/1974 | Crim | ...................... H02G 11/02 137/355.23 |
| 5,700,158 | A | * | 12/1997 | Neiser | .................. H01R 13/641 439/373 |
| 6,515,229 | B2 | * | 2/2003 | Aoki | ................... B60R 16/0215 174/69 |

(Continued)

*Primary Examiner* — Mark Le
(74) *Attorney, Agent, or Firm* — Cantor Colburn LLP

(57) ABSTRACT

A cable-arranging assembly coupled to a table such that a mobile device is displayed. A cable extends through a guide housing and a withdrawal unit configured such that the cable is connected to the mobile device. The guide housing and the withdrawal unit are coupled to the upper and lower portions of the table. A guide unit is rotatably disposed within the guide housing. The guide unit rotates along with rotation of the cable in the direction in which the cable rotates, thereby preventing the cable from being twisted or cut.

9 Claims, 12 Drawing Sheets

(56) References Cited

U.S. PATENT DOCUMENTS

| | | | |
|---|---|---|---|
| 8,558,688 B2* | 10/2013 | Henson | G06F 1/1626 340/539.1 |
| 2009/0168383 A1* | 7/2009 | Goto | G06F 1/1616 361/790 |

* cited by examiner

CABLE-WITHDRAWING ASSEMBLY

BACKGROUND OF THE INVENTION

Field of the Invention

The present invention generally relates to a cable-arranging assembly coupled to a table such that a mobile device is displayed. More particularly, the present invention relates to a cable-arranging assembly including a cable configured to be connected to a mobile device, a guide housing and a withdrawal unit configured such that a cable extends therethrough, the guide housing and the withdrawal unit being coupled to the upper and lower portions of the table, and a guide unit rotatably disposed within the guide housing, wherein the guide unit rotates along with rotation of the cable in the direction in which the cable rotates, thereby preventing the cable from being twisted or cut.

Description of the Related Art

In general, when a product (mobile device) or the like is displayed, a main cable is connected to an anti-theft device for protection against theft, and a cable is connected to the product and the main cable. When the cable is separated from the product, a separation signal is generated, and the anti-theft device generates an alarm in response to the separation signal. The cable is configured to be extensible such that the product can be easily handled. The cable can be arranged in position when the product is displayed. A cable-winding device is also provided. When the main cable is connected to an external power source instead of the anti-theft device, the cable-winding device is used to allow a user to easily transmit data from the product or charge the product.

An approach of the related-art pertaining to this technology was disclosed by Korean Laid-Open Patent Publication No. 10-2013-0107782, titled "BURGLAR ALARM SYSTEM AND CABLE FOR DISPLAY PRODUCT."

The burglar alarm system and cable for a display product disclosed by this related-art approach includes: an attachment unit attachable to a product; a sensor configured to be disposed on a portion of the attachment unit joining the product in order to detect attachment or detachment of the product to or from the product; at least one operation lamp configured to be mounted on an area of the attachment unit; and a cable including a connector, a sensor line connected to the sensor and the connector, and a power line connecting the operation lamp and the connector.

However, according to this related-art approach, it is impossible to extend the power line between the attachment unit attached to the display product and a control unit or neatly arrange the power line. Thus, a user suffers from difficulties when demonstrating the display product.

Therefore, in order to solve this problem, approaches for unwinding and arranging power lines have been proposed.

Such an approach was disclosed by Korean Registered Utility Model No. 20-0472989, titled "EARPHONE UNIT HAVING RIBBON CABLE."

The earphone unit disclosed by this related-art approach includes: a connection terminal attachable to an earphone terminal of a mobile terminal and detachable therefrom; a thin ribbon-shaped base having a preset width in the lateral direction with respect to the longitudinal direction; a ribbon cable having a plurality of conducting wires disposed in the base, the conducting wires extending in the longitudinal direction and transmitting data therethrough, wherein one end of the ribbon-shaped able is connected to the connection terminal to transfer a voice signal; an earphone connected to the other end of the cable; and a housing containing the cable therein, wherein one end of the housing has a terminal-fixing part that fixes or releases one end of the connection terminal, and the other end of the housing has an earphone-fixing part that fixes or releases the earphone.

However, this related-art approach is only intended to prevent the cable from being twisted by forming the earphone cable as a flexible printed circuit board (FPCB). When the earphone is extended from the housing, a first cable and a second cable connected to each other may be twisted or cut, which is problematic.

Another approach of the related art is Korean Patent No. 10-1417707, titled "EARPHONE-INTEGRATED MOBILE TERMINAL CASE."

The earphone-integrated mobile terminal case disclosed by this related-art approach includes: a case body having a storage space therein, with a mobile terminal being coupled to one side thereof; a plurality of earphone-winding parts supported in the storage space of the case body, the plurality of earphone-winding parts being rotatable in a restorable manner; an earphone-connecting circuit including a plurality of rotatable connection terminals each concentrically disposed on one surface of the corresponding earphone-winding part, a plurality of fixed connection terminals disposed on the inner surface of the case body such that the plurality of fixed connection terminals are disposed on tracks along which the rotatable connection terminals rotate, and a plurality of conducting wires disposed on the inner surface of the case body to electrically connect the fixed connection terminals; and an earphone including a plurality of earphone heads connected to the rotatable connection terminals while being exposed externally from the case body, wherein an earphone cable is withdrawn from the case body when external force in the direction of releasing from one of the earphone-winding parts acts on the corresponding earphone head, and the earphone cable is wound following the restoration of the corresponding earphone-winding part when external force is terminated.

This related-art approach allows electrical connection by rotating the plurality of rotatable connection terminals. However, this approach has a complicated structure, and when the rotatable connection terminals are misaligned in position, electrical connection is not made.

A further approach of the related art was disclosed in Korean Patent No. 10-0433005, titled "CABLE ARRANGING DEVICE."

The cable arranging device disclosed by this related-art approach includes: a shell-shaped upper body having an upper cable accommodation space in which cables are accommodated; a lower body having a plurality of cable fixing recesses at the distal end, the plurality of cable fixing recesses having a size allowing the cables to be interference-fitted into the cable fixing recesses, and a lower cable accommodation space in which the cables are accommodated; and a shaft rod fixedly connecting the upper body and the lower body such that the distal end of the upper body and the distal end of the lower body are distanced at a preset distance while facing each other, the shaft rod being in the shape of a column having an elliptical cross-sectional on which the cables can be wound. Anti-dislodgement stepped portions protrude in ward from the distal ends of the upper body and the lower body.

However, this related-art approach can arrange only one cable by winding it. Since the body is always positioned in the middle of the cable, when the cable is stretched, the body positioned in the middle of the cable causes inconvenience.

The information disclosed in the Background of the Invention section is only for the enhancement of understanding of the background of the invention, and should not be taken as an acknowledgment or as any form of suggestion that this information forms a prior art that would already be known to a person skilled in the art.

RELATED ART DOCUMENTS

Patent Document 1: Korean Laid-Open Patent Publication No. 10-2013-0107782
Patent Document 2: Korean Registered Utility Model No. 20-0472989
Patent Document 3: Korean Patent No. 10-1417707
Patent Document 4: Korean Patent No. 10-0433005

SUMMARY OF THE INVENTION

Accordingly, the present invention has been made keeping in mind the above problems occurring in the related art, and the present invention is intended to propose a cable-arranging assembly including a guide housing and a withdrawal unit through which a cable connected to a mobile device extends, the guide housing and the withdrawal unit being respectively disposed in an upper portion and a lower portion of a table, wherein the cable can freely rotate when the cable is withdrawn or retracted through a guide unit rotatably disposed in the guide housing.

Also provided is a cable-arranging assembly, wherein the guide unit includes a fixed body, a rotatable body disposed within the fixed body, and a ball bearing allowing the rotatable body to rotate, whereby the cable can easily rotate without restrictions in the direction of rotation, and the mobile device can be freely handled.

Also provided is a cable-arranging assembly, wherein at least one of the guide unit and the withdrawal guide further includes a roller, whereby the cable can be more properly withdrawn or retracted.

Also provided is a cable-arranging assembly, wherein the guide housing and the withdrawal unit are fixedly coupled by means of fixing bolts, and are distanced from each other by means of a spacing part, whereby the length of the fixing bolts can be adjusted depending on the thickness of the table.

In order to achieve the above object, according to one aspect of the present invention, a cable-arranging assembly includes: a cable connected to a mobile device; a guide housing through which the cable extends, the guide housing being coupled to an upper portion of a through-hole of a table; a guide unit disposed within the guide housing such that the cable extends through the guide housing, wherein the guide housing rotates depending on a direction in which the cable rotates; and a withdrawal unit disposed on a lower portion of the through-hole, wherein the withdrawal unit includes a withdrawal guide guiding withdrawal and retraction of the cable and a recoiler connected to the withdrawal guide such that the cable is wound on the recoiler.

The guide unit may include a fixed body, a rotatable body disposed within the fixed body, a plurality of ball bearings disposed in the rotatable body to cause the rotatable body to rotate with respect to the fixed body.

According to the present invention, the cable-arranging assembly includes the guide housing and the withdrawal unit through which a cable connected to a mobile device extends, the guide housing and the withdrawal unit being respectively disposed in an upper portion and a lower portion of a table. The guide unit is rotatably disposed within the guide housing. When a viewer tests the mobile device by raising the mobile device, the guide unit rotates following the rotation of the cable in the direction of the mobile device, thereby preventing the cable from being twisted or cut. The viewer can more easily look over the mobile device without resistance that would otherwise be caused by frictional force.

In addition, the guide includes the fixed body, the rotatable body, and the ball bearing allowing the rotatable body to rotate. When the rotatable body rotates with respect to the fixed body, the ball bearings roll, allowing the rotatable body to smoothly rotate and reduce frictional force that would otherwise occur during the rotation of the rotatable body. Consequently, a user can conveniently use the mobile device without difficulties.

Furthermore, at least one of the guide unit and the withdrawal guide further includes the roller. Since the roller can roll when the cable is withdrawn or retracted, frictional force that occurs during the withdrawal or retraction of the cable is reduced. This can consequently prevent the cable from being cut, thereby further improving the endurance of the cable.

In addition, the guide housing and the withdrawal unit are fixedly coupled by means of fixing bolts, and are distanced from each other by means of the spacing part. The degree of coupling of the fixing bolts can be adjusted depending on the thickness of the table. The usability of the guide housing and the withdrawal unit is improved, and the guide housing and the withdrawal unit can be firmly coupled regardless of the thickness of the table.

BRIEF DESCRIPTION OF THE DRAWINGS

The above and other objects, features and advantages of the present invention will be more clearly understood from the following detailed description when retracted conjunction with the accompanying drawings, in which.

DETAILED DESCRIPTION OF THE INVENTION

Figure 1:
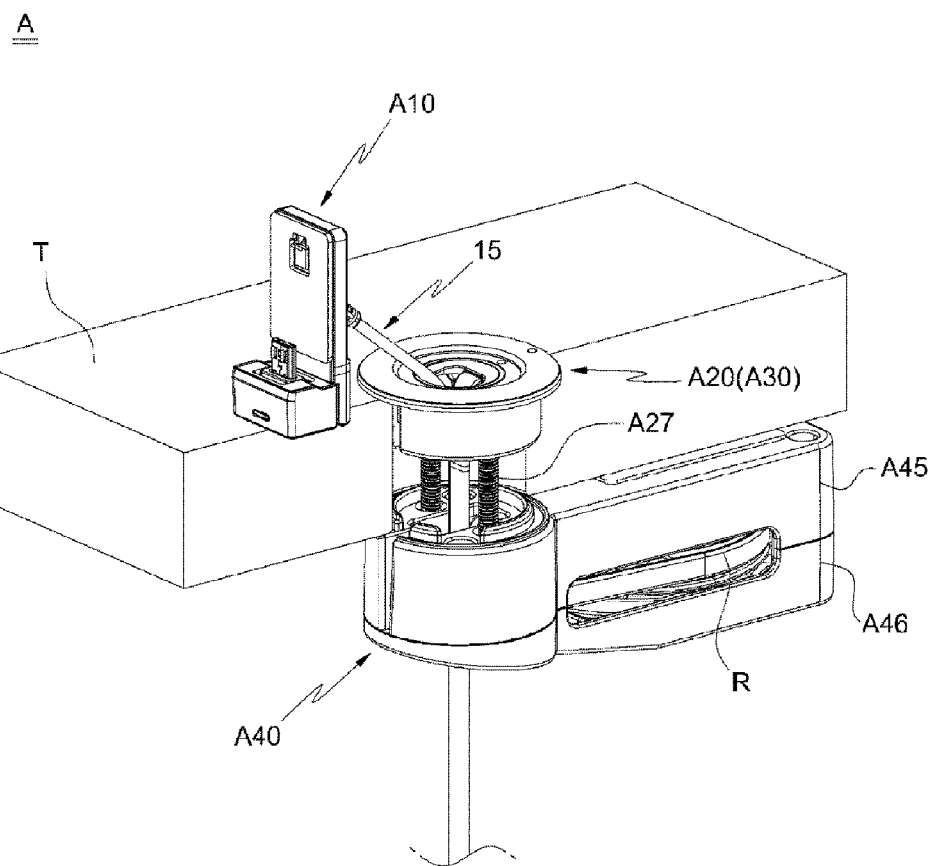
FIG. 1 is a perspective view illustrating a cable-arranging assembly according to an exemplary embodiment of the invention.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or reference numerals having the same last two digits and letters refer to like elements having like functions throughout, and unless the context clearly indicates otherwise, elements referred to by reference numerals of the drawings should be understood based on this standard.

Also, for convenience of understanding of the elements in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
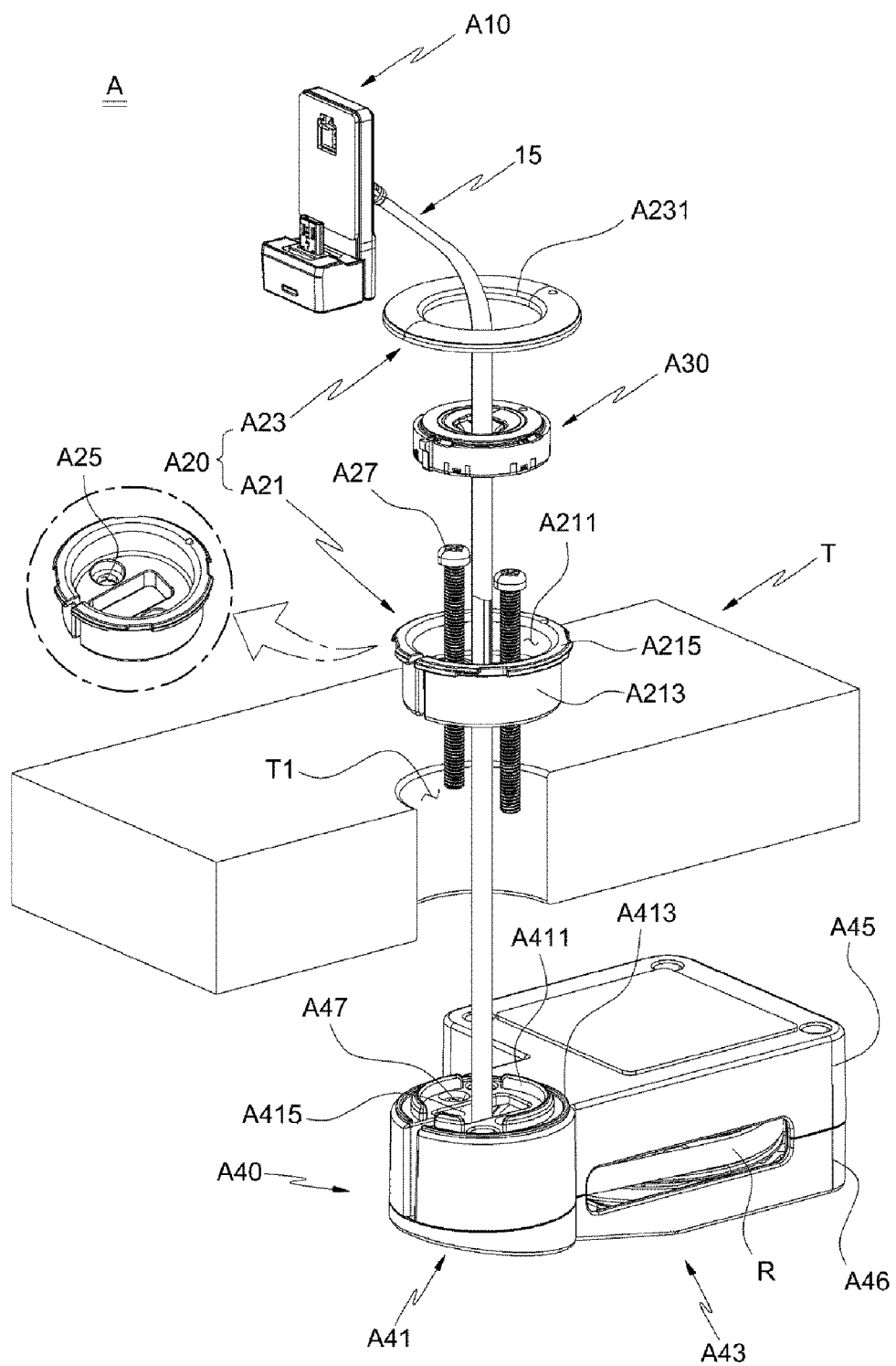
FIG. 2 is an exploded perspective view illustrating the cable-arranging assembly according to the exemplary embodiment of the invention.

Referring to FIGS. 1 and 2, a cable-arranging assembly A according to an exemplary embodiment of the invention includes: a cable 15 connected to a mobile device A10; a guide housing A20 and a withdrawal unit A40 coupled to the upper and lower portions of a table T, the cable 15 extending through the guide housing A20 and the withdrawal unit A40; and a guide unit A30 rotatably disposed within the guide housing A20.

These components will now be described in more detail with reference to the accompanying drawings.

The table T on which the mobile device A10 is displayed has a through-hole T1. A cable 15 is connected to the mobile device A10. An anti-theft device is connected to one end of the cable 15 such that the anti-theft device can generate an alarm sound when the cable 15 is separated from the mobile device A10.

The cable 15 is connected to the mobile terminal A10, and the guide housing A20 and the withdrawal unit A40 through which the cable 15 extends are respectively provided in the upper and lower portions of the table T.

The cable 15 extends through the through-hole T1 of the table T such that the mobile device A10 protrudes above the table T.

The guide housing A20 is coupled to the upper portion of the table T, i.e. the upper portion of the through-hole T1 that extends through the table T, and the guide unit A30 is disposed within the guide housing A20.

The guide housing A20 includes a guide holder A21 having an inner receptacle A211 therein to which the guide unit A30 can be coupled and a guide cover A23 covering the inner receptacle A211 of the guide holder A21.

The guide holder A21 includes an outer A213 and a flange part 215. The outer wall part A213 is coupled to the table T, more particularly, to the upper portion of the through hole T1. The outer wall part A213 is partially fitted into the upper portion of the through-hole T1. The flange part A215 is bent outward from the outer wall part A213 to support the upper surface of the table T. Thus, the guide holder A21 can be fitted into the upper portion of the through-hole T1, while the flange part A215 prevents the guide holder A21 from slipping out through the through-hole T1.

In addition, the guide cover A23 covering the inner receptacle A211 of the guide holder A21 is coupled to the guide holder A21. The guide holder A21 is doughnut-shaped such that the cable 15 extends therethrough, and a smoothly-curved portion A231 is formed in the inner portion of the guide cover A23. This configuration overcomes the problem that the cable 15 may be cut while being withdrawn or retracted through the guide housing A20 and the guide unit A30.

Furthermore, the withdrawal unit A40 for withdrawal and retraction of the cable 15 is disposed in the lower portion of the table T. The withdrawal unit A40 includes a withdrawal guide A41 disposed in the lower portion of the through-hole T1 to guide withdrawal and retraction of the cable 15 and a recoiler R disposed adjacent to the withdrawal guide 41 to wind the cable 15 thereon.

More specifically, the withdrawal unit A40 includes a lower body A46 and an upper body A45 coupled to the lower body A46. The bodies including the upper body A45 and the lower body A46 form the withdrawal guide A41 and a recoiler receptacle A43 connected to the withdrawal guide A41. The recoiler R that winds the cable 15 thereon is disposed within the recoiler receptacle A43.

The recoiler R will be described in more detail later.

Returning to the withdrawal unit A40, the upper body A45 disposed below the table T adjoins the undersurface of the table T. More specifically, the withdrawal guide A41 of the upper body A45 has an inner support protrusion A411 protruding upward and an outer support protrusion A413 disposed outward of the inner support protrusion A411 at a preset distance therefrom.

The support protrusions A411 and A413 are disposed adjoining the lower circumference of the through-hole T1. The inner support protrusion A411 or the outer support protrusion A413 is caught by the lower portion of the through-hole T1 depending on the size of the through-hole T1. Thus, the withdrawal guide A41 of the upper body A45 is positioned such that the withdrawal guide A41 can communicate with the through-hole T1. The support protrusions A411 and A413 can prevent the withdrawal guide A41 from shaking or being dislodged from the through-hole T1.

In addition, a passage hole A415 is formed in the portion of the upper body A45 forming the withdrawal guide A41, such that the cable 15 extends from the recoiler R through the passage hole A415 and is connected to the above-positioned mobile device A10 through the through-hole T1.

According to the present embodiment, the guide unit A30 and rollers are further provided on the table T. The guide unit A30 and the rollers allow the cable 15 to be withdrawn and retracted while preventing the cable 15 from being cut or twisted.

Describing the respective components in greater detail, first, as illustrated in FIGS. 1 and 2, the guide unit A30 is positioned in the inner receptacle A211 disposed within the guide housing A20, allowing the cable 15 to extend through.

Figure 3:
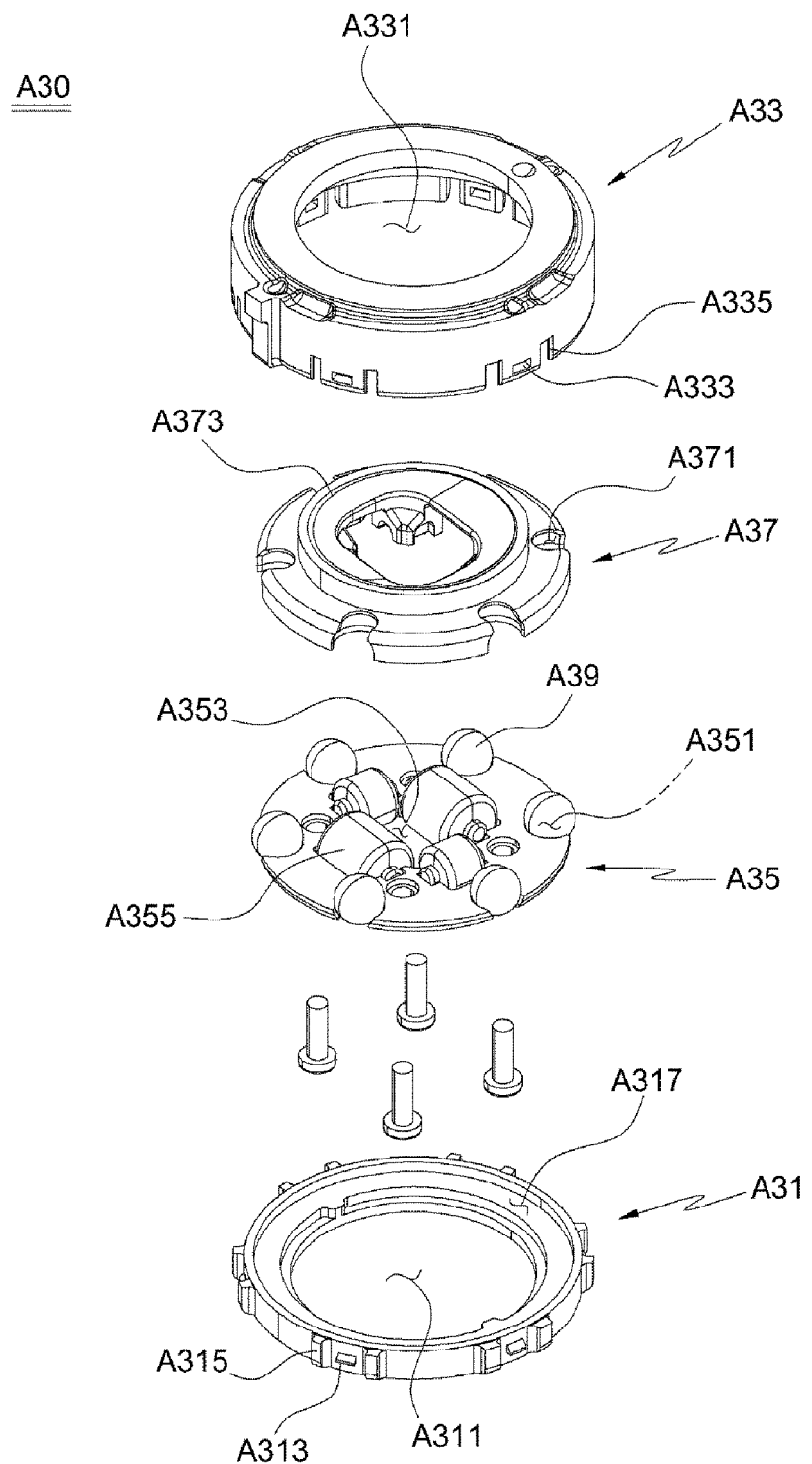
FIG. 3 is an exploded perspective view of the guide housing and the guide unit of the cable-arranging assembly according to the exemplary embodiment of the invention.

FIG. 3 illustrates the guide unit A30 in greater detail. Referring to FIG. 3, the guide unit A30 includes a fixed body A31, a fixed body cover A33 covering the fixed body A31, a rotatable body A35 disposed within the fixed body A31 and the fixed body cover A33, and a rotatable body cover A37 covering the rotatable body A35.

More specifically, in the guide unit A30, the fixed body A31 is disposed within the guide housing A30 and is ring-shaped, and the fixed body cover A33 covers the fixed body A31.

The fixed body A31 has a through-hole A311 in the central portion thereof. A plurality of catching protrusions A313 and a plurality of fixing protrusions A315 are disposed on the outer circumference of the fixed body A31. Each pair of fixing protrusions A315 is disposed on both sides of the corresponding catching protrusion A313.

The fixed body cover A33 has a communication hole A331 in the central portion, the communication hole A331 communicating with the through-hole A311. The fixed body cover A33 has catching holes A333 and fixing recesses A335 in the outer circumference. The catching protrusions A313 can be fixedly fitted into the catching holes A333, and each pair of fixing recesses A335 is disposed on both sides of the corresponding catching holes A333.

Consequently, the fixed body A31 and the fixed body cover A33 are firmly fixed to each other by means of the catching protrusions A313 and the fixing protrusions A315.

In addition, the rotatable body A35 is disposed within an assembly of the fixed body A31 and the fixed body cover A33. The rotatable body A35 is in the shape of a disk, with a plurality of first rotary recesses A351 being formed in the outer circumference. The rotatable body cover A37 has a plurality of second rotary recesses A371 corresponding to the first rotary recesses A351 and a fitting protrusion A373 protruding upward from the central portion. The fitting protrusion A373 is configured to be fitted into the communication hole A331. The rotatable body cover A37 is fixed to the upper portion of the disc-shaped rotatable body A35 by bolt fastening.

In addition, a ball bearing A39 is disposed in each pair of the first and second rotary recesses A351 and A371. It is preferable that the diameter of the first rotary recesses A351 is set smaller than the diameter of the ball bearings A39, such that the ball bearings A39 can roll freely within the corresponding first and second rotary recesses A371 without escaping therefrom. A connection hole A353 is formed in the central portion of the rotatable body A35 such that the cable 15 can extend therethrough.

The rolling of the ball bearings A39 allows an assembly of the rotatable body A35 and the rotatable body cover A37 to freely rotate within an assembly of the fixed body A31 and the fixed body cover A33. For this, the fixed body A31 has an inwardly-recessed seating lane A317 in which the ball bearings A39 partially protruding downward from the rotatable body A35 can be seated and move.

When a user rotates the cable 15 that has extended through the guide unit A30 having this structure (by displacing the mobile device A10), the rotatable member A35 rotates along the cable 15, thereby preventing the cable 15 from being twisted and allowing the cable 15 to be easily moved by the user.

In addition, when the cable 15 is withdrawn and retracted, frictional force is produced between the cable 15 and the other components depending on the degree of withdrawal or retraction of the cable 15.

In order to reduce such frictional force, according to the invention, the rollers are disposed on at least one of the guide unit A30 and the withdrawal guide A41. The rollers roll following the withdrawal or retraction of the cable 15.

First, as illustrated in FIG. 3, a plurality of first rollers A355, more particularly, four first rollers A355 are disposed around the connection hole A353 of the rotatable body A35. Among the first rollers A355, the opposite rollers have the same size, whereas the adjacent rollers have different sizes. This is because the cable 15 employed by the invention is shaped flat instead of being cylindrical. Thus, the size of the rollers is selected depending on the contact are of the cable 15. When the cable 15 has a circular cross-sectional shape, it is preferable that the first rollers A355 have the same size. However, this is not intended to limit the scope of the invention.

In addition, the rollers are in the shape of a cylinder with engagement protrudes on both sides, and the rotatable body A35 has engagement recesses at corresponding positions, such that the rollers can roll. Since this configuration is identical with known configurations of rollers, a detailed description thereof will be omitted.

Consequently, when the cable 15 is withdrawn and retracted through the guide unit A30, the rollers roll through contact with the cable 15 following the withdrawal and retraction of the cable 15, thereby minimizing frictional force. When the cable 15 rotates, the assembly of the rotatable body A35 and the rotatable body cover A37 rotates on the ball bearings A39, thereby reducing frictional force. This can consequently improve the convenience of use while preventing the cable 15 from being cut by the frictional force or being twisted due to the rotation thereof.

Figure 4:
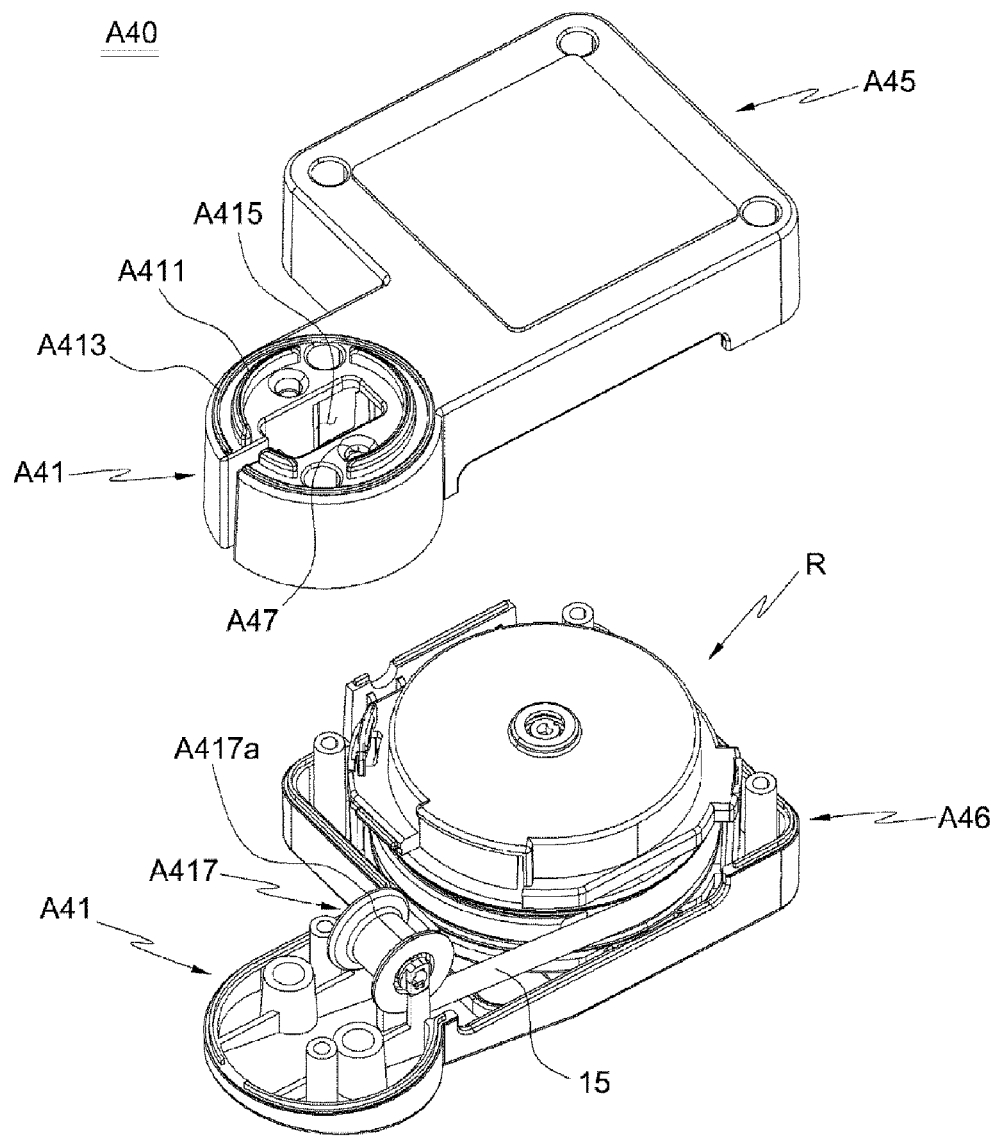
FIG. 4 is an exploded perspective view of the withdrawal unit of the cable-arranging assembly according to the exemplary embodiment of the invention.

In addition, as illustrated in FIG. 4, it is preferable that the withdrawal guide A41 disposed on the lower portion of the table T be provided with a second roller A417.

In general, the cable 15 unwound from the recoiler R is bent in the vertical direction in order to pass through the table T, thereby increasing the frictional force of the bent portion of the cable 15. In order to reduce the frictional force on the bent portion, the withdrawal guide A41 has the second roller A417, which is configured to roll following the withdrawal and retraction of the cable 15.

Anti-dislodgement flanges A417a are disposed on both ends of the roller A417 to prevent the cable 15 from being dislodged from the roller 417. The diameter of the anti-dislodgement flanges A417a is set greater than the diameter of the middle portion of the roller A417, thereby preventing the cable 15 from being dislodged from the roller 417 during the withdrawal and retraction of the cable 15.

In addition, the guide housing A20 and the withdrawal unit A40 are respectively disposed in the upper and lower portions of the through-hole T1 in the Table T. The guide housing A20 and the withdrawal unit A40 can be fixedly coupled to each other.

However, the table T may have a variety of thicknesses, so a variety of devices matching the thicknesses must be newly fabricated, which is problematic.

In order to overcome this problem, the guide housing A20 and the withdrawal unit A40 are coupled to each other by means of fixing bolts A27, while a spacing part is provided to maintain the guide housing A20 and the withdrawal unit A40 at a predetermined distance from each other, such that the guide housing A20 and the withdrawal unit A40 are positioned in the upper and lower portions of the table T.

More specifically, the guide housing A20 has first bolt holes A25, and the withdrawal guide A41 has second bolt holes A47 (in the portions of the upper body A45 adjacent to the withdrawal guide A41), such that the fixing bolts A27 can be fastened into the first bolt holes A25 and the second bolt holes A47.

Here, the spacing part ensures the guide unit A30 and the withdrawal guide A41 are spaced part from each other within the through-hole T1, such that guide unit A30 and the withdrawal guide A41 are not completely fitted into the through-hole T1.

Thus, the guide housing A20 and the withdrawal unit A40 are positioned only in the upper and lower portions of the through-hole T1, and the size of the spacing part is determined variously depending on the thickness of the table T. Since the length of the fixing bolts A27 can be selected from a variety of values depending on the size of the spacing part, the guide housing A20 and the withdrawal unit A40 can be coupled to each other and fixed to the table regardless of the thickness of the table T.

In addition, the recoiler R allowing the cable 15 to be withdrawn and retracted is disposed in the withdrawal unit A40.

Figure 5:
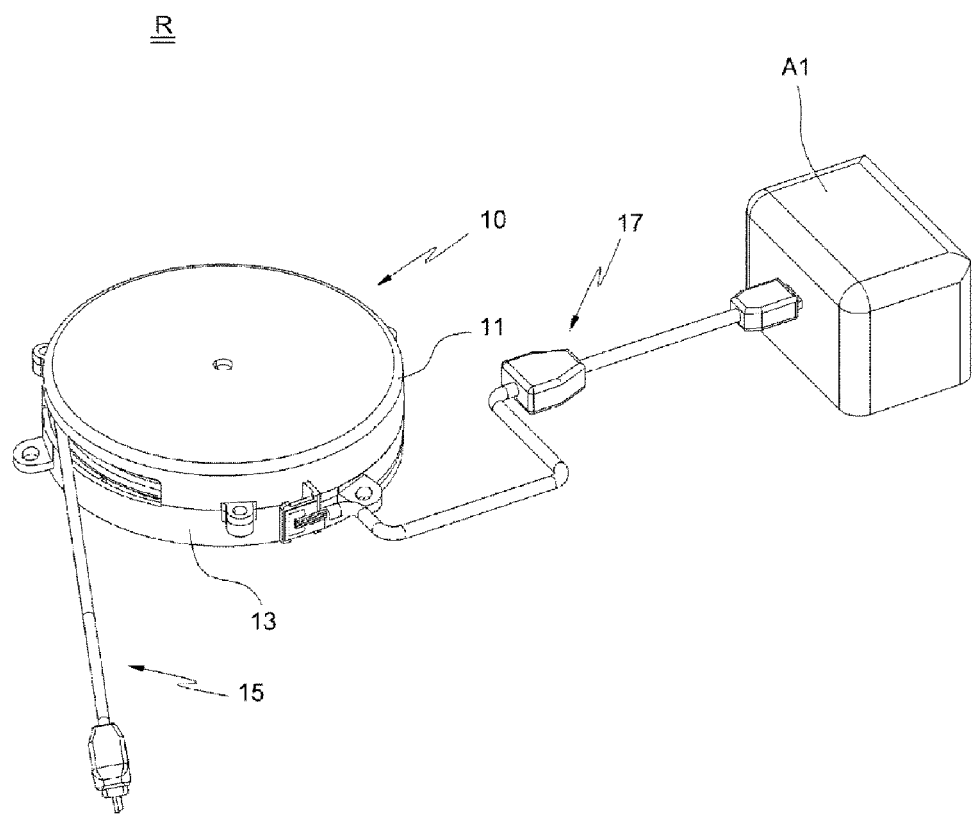
FIG. 5 is a perspective view of the recoiler according to the exemplary embodiment of the invention.
Figure 6:
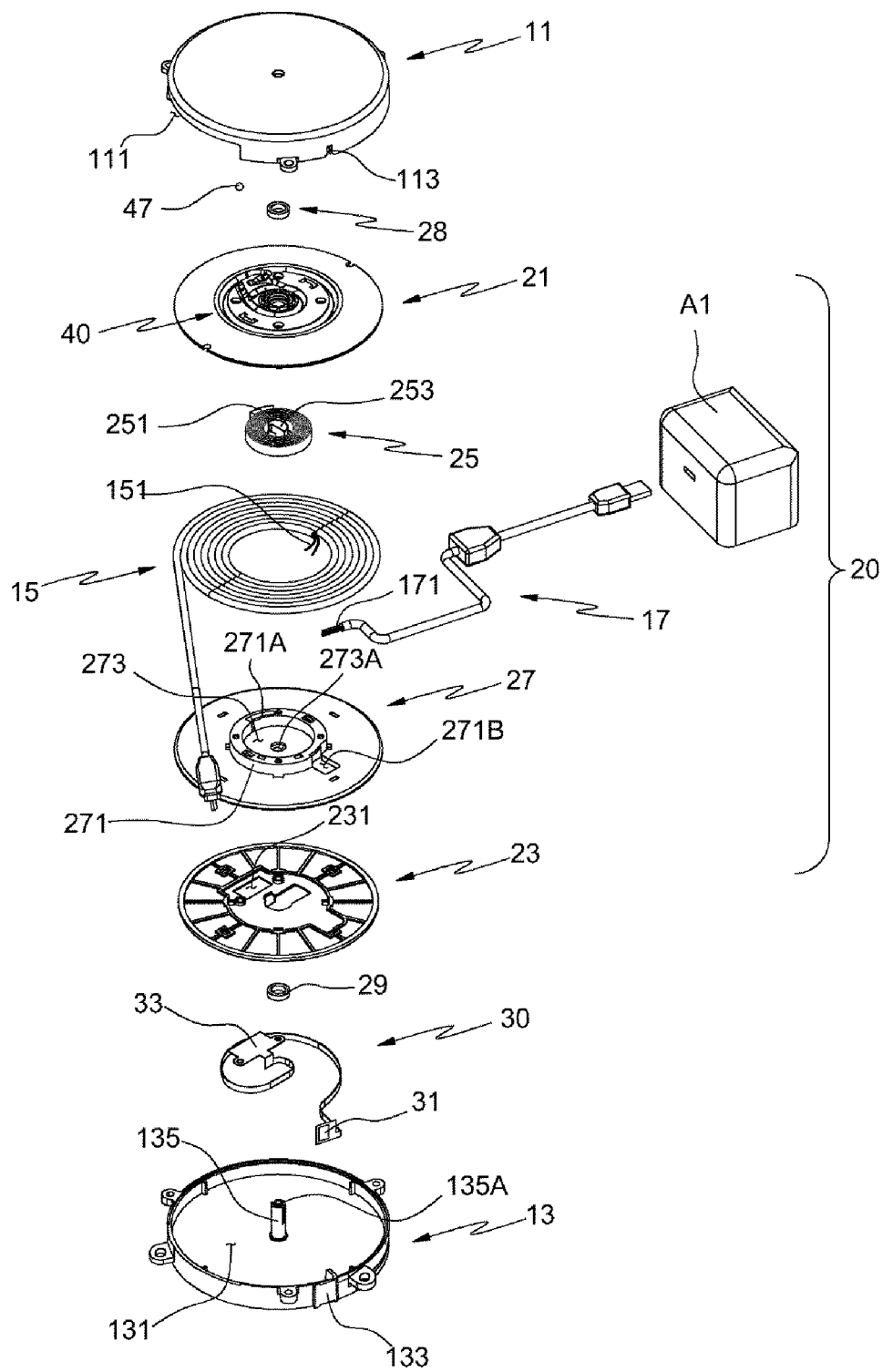
FIGS. 6 and 7 are perspective views of the recoiler according to the exemplary embodiment of the invention.
Figure 7:
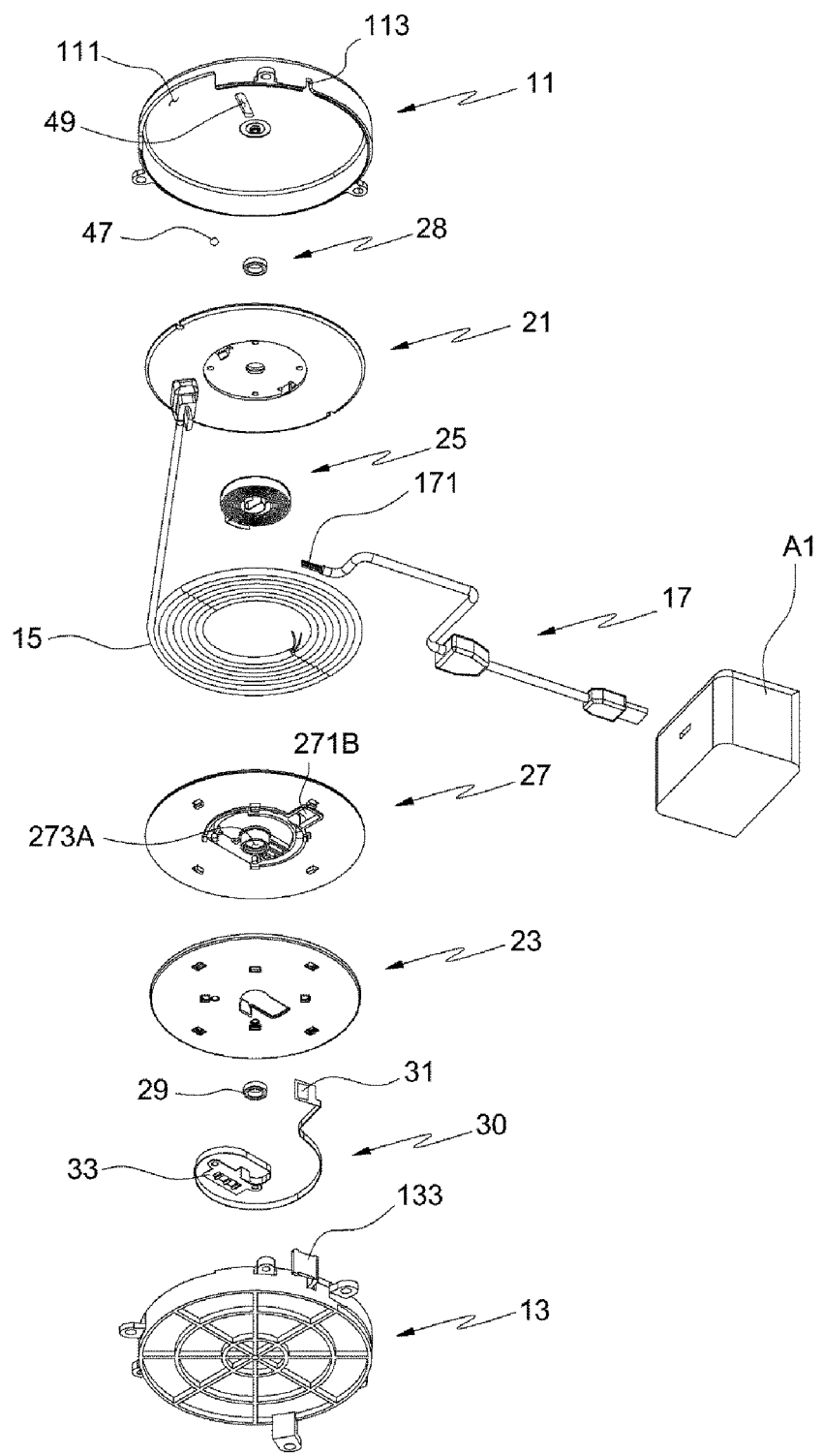

First, as illustrated in FIGS. 5 and 7, the recoiler R according to the invention includes a body 10, a winding unit 20 disposed in the body to wind and unwind the cable 15, and a connector unit 30 connecting the cable 15 to a main cable 17.

More specifically, the body 10 includes an upper body 11 and a lower body 13 that are coupled to each other such that an accommodation space 131 is defined therein. The upper body 11 has a withdrawal/retraction hole 111 in the outer circumference, through which the cable 15 to be connected to a product to be described later can protrude outward. The upper body 11 has an earth through-hole 113 in a lower portion, through which a first earth part 31 of the connector unit 30 (e.g. an FPCB) can protrude outward to be connected to a main earth part 171 of the main cable 17.

It is preferable that a portion of the main cable 17 be connected to an external power source that supplies power to the product or an anti-theft device A1 that generates a theft alarm when the cable 15 is separated from the product. However, this is not intended to limit the scope of the invention.

The lower body 13 engaging with the upper body 11 has the accommodation space 131 in which the winding unit 20 and the connector unit 30 are accommodated. The lower body 13 has a protruding earth-fixing part 133 that can fix the first earth part 31 protruding outward through the earth through-hole 113. The first earth part 31 and the earth-fixing part 133 can be fixed using a variety of related-art bonding means (e.g. a bond, a glue gun, silicone, or the like).

A center protrusion 135 protrudes from the central portion of the lower body 13, such that the winding unit 20 to be described later can rotate on the center protrusion 135.

The recoiler R according to the invention has a winding unit 20 that can wind or unwind the cable 15. More specifically, the winding unit 20 includes a winding member 27 able to wind or unwind the cable 15, an upper cover 21 disposed over the winding member 27, a lower cover 23 disposed under the winding member 27, and an elastic member 25 inducing elastic force to the winding member 27. Coupling the upper cover 21 and the lower cover 23 to each other prevents the cable 15 from being dislodged outwardly, thereby forming one assembly.

More specifically, the winding member 27 has a receptacle 273 in the central portion, in which the elastic member 25 able to induce elastic force to the winding member 27 can be accommodated, and a winding protrusion 271 protruding along the circumference of the receptacle 273 such that the cable 15 can be wound on the winding protrusion 271. The receptacle 273 has a through-hole 273A in the central portion, through which the center protrusion 135 can extend. The center protrusion 135 extends through the central portion of the elastic member 25 accommodated in the receptacle 273.

More specifically, the elastic member 25 is implemented as a leaf spring, which is coiled. A first fixing portion 251 positioned outside is coupled to a coupled recess 271A formed on the winding protrusion 271. In addition, a second fixing portion 253 positioned in the central portion of the elastic member 25 extends through the through-hole 273A and is coupled to a center-fixing recess 135A disposed on the center protrusion 135, which is positioned at the central portion of the elastic member 25. When the winding member 27 rotates on the center protrusion 135, the winding member 27 can be restored to the original position by the elastic force of the elastic member 25. Consequently, when the cable 15 wound on the outer circumference of the winding protrusion 271 is unwound, elastic force in the direction of rewinding the cable 15 can be induced.

In addition, the winding protrusion 271 has a connector hole 271B. The connector hole 271B allows an earth terminal 151 disposed on one end of the cable 15 to extend through such that the earth terminal 151 can be coupled to a second earth part 33 that is positioned in the lower cover 23 to be described later.

An upper cover 21 is disposed over the winding member 27, and a lower cover 23 is disposed under the winding member 27. The upper cover 21 and the lower cover 23 are coupled to each other to prevent the cable 15 and the elastic member 25 from being dislodged, thereby forming an assembly. A fixing means 40 to be described in more detail later is further disposed over the upper cover 21. The second earth part 33 of the FPCB 30 is fixed to the lower cover 23, thereby forming an earth connecting part to which the earth terminal 151 of the cable 15 that has extended downwardly through the connector hole 271B can be coupled.

More specifically, the connector unit 30 is disposed under the lower cover 23. The connector unit 30 is implemented as a flexible conductor, in particular, an FPCB 30. The FPCB 30 has the first earth part 31 on one end, which protrudes outward through the earth through-hole 113 of the upper body 11 and is fixed to the earth-fixing part 133. The fixed first earth part 31 is then connected to the main earth part 171 of the main cable 17. In addition, the FPCB 30 has the second earth part on the other end. The second earth part 33 can be positioned on an earth connecting portion 231 of the lower cover 23 to connect the main cable 17 and the cable 15 through contact with the earth terminal 151 of the cable 15.

Figure 8A:
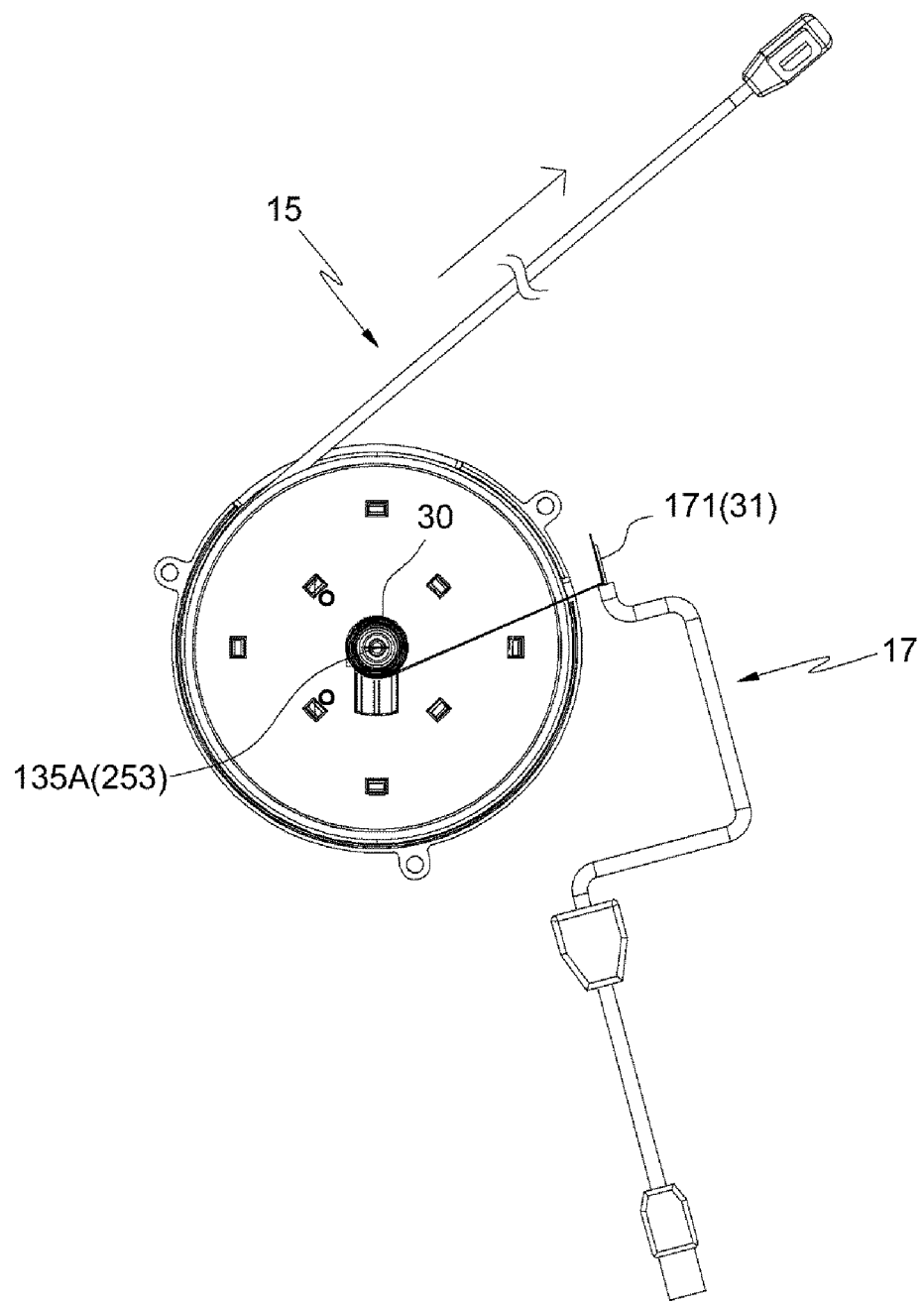
FIGS. 8A, 8B, 9A, 9B, and 9C are views illustrating the states in which the recoiler according to the exemplary embodiment of the invention is used.
Figure 8B:
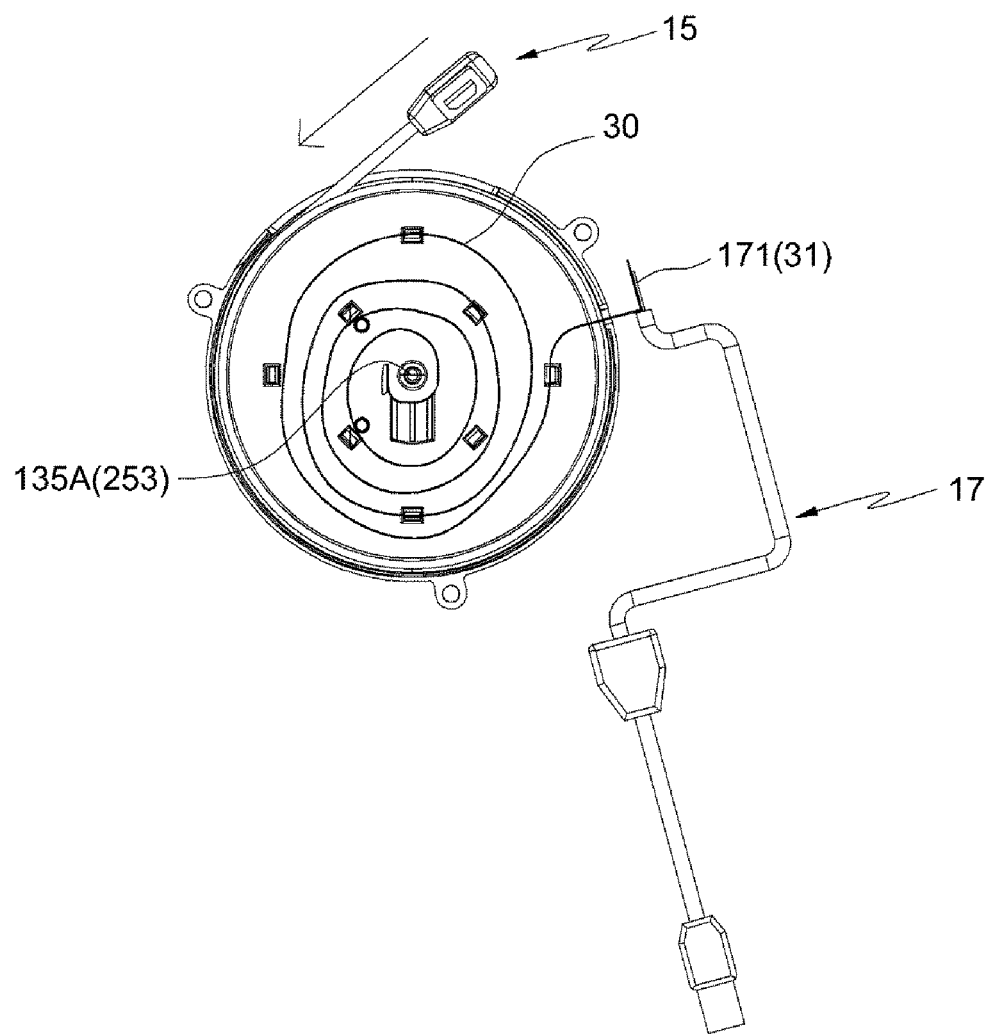

FIGS. 8A and 8B illustrate the states of the use of the FPCB 30. As illustrated in FIG. 8A, when the cable 15 is unwound, the upper cover 21, the lower cover 23, and the winding member 27 rotate, and the FPCB 30 is wound on the center protrusion 135 by the second earth part 33 fixed to the lower cover 23 and the first earth part 31 disposed on the lower body 13. In addition, as illustrated in FIG. 8B, when the cable 15 is wound by the elastic member 25, the FPCB 30 is unwound from the center protrusion 135 and becomes loose. Consequently, when the cable 15 is wound or unwound, the cable 15 can stay connected to the main cable 17. In addition, the connector unit 30 implemented as the FPCB 30 can overcome the problem in that the cable would otherwise be cut.

In addition, a first bearing 28 and a second bearing 29 coupling to the center protrusion 135 are respectively disposed on the upper portion of the upper cover 21 and on the lower portion of the lower cover 23. An assembly including the upper cover 21, the winding member 27, and the lower cover 23 can properly rotate on the center protrusion 135 within the accommodation space 131 in the body 10.

A user unwinds the cable 15 when testing a product. At this time, when force is induced in the direction in which the cable 15 is rewound by the elastic force of the elastic member, the user may suffer from inconvenience. In order to prevent this, a means for maintaining the cable 15 in the unwound position is required. Thus, the recoiler R according to the invention includes the fixing means 40. The fixing means 40 includes a fixing ball 47, a movement path 41 along which the fixing ball 47 moves, and a fixing path 43 along which the fixing ball 47 is fixed.

Figure 9A:
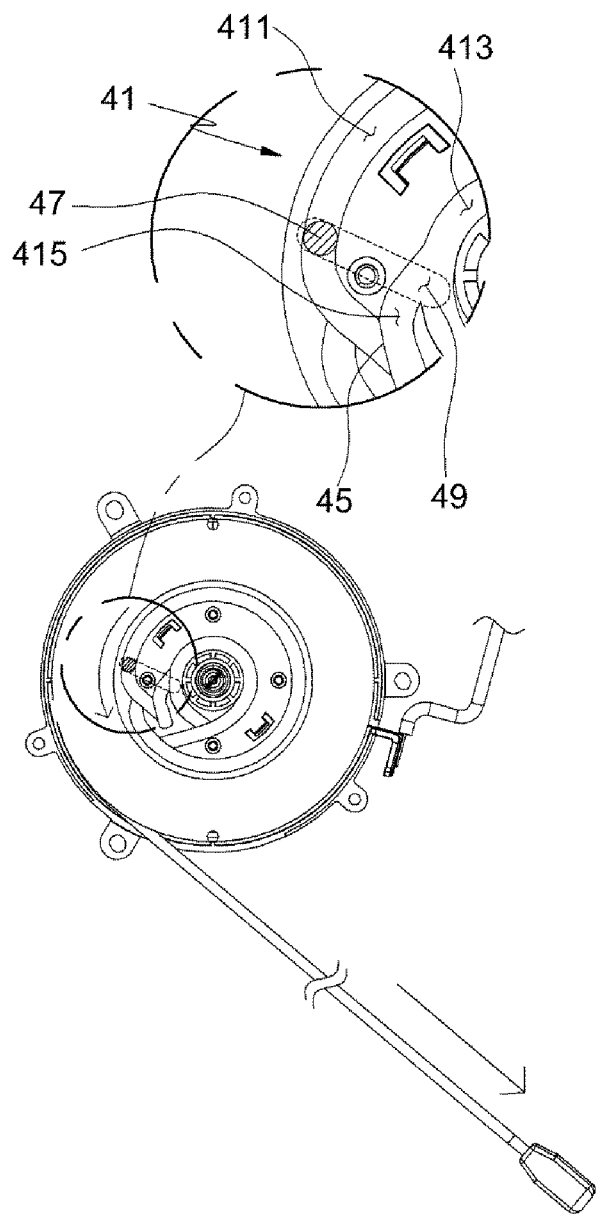
Figure 9B:
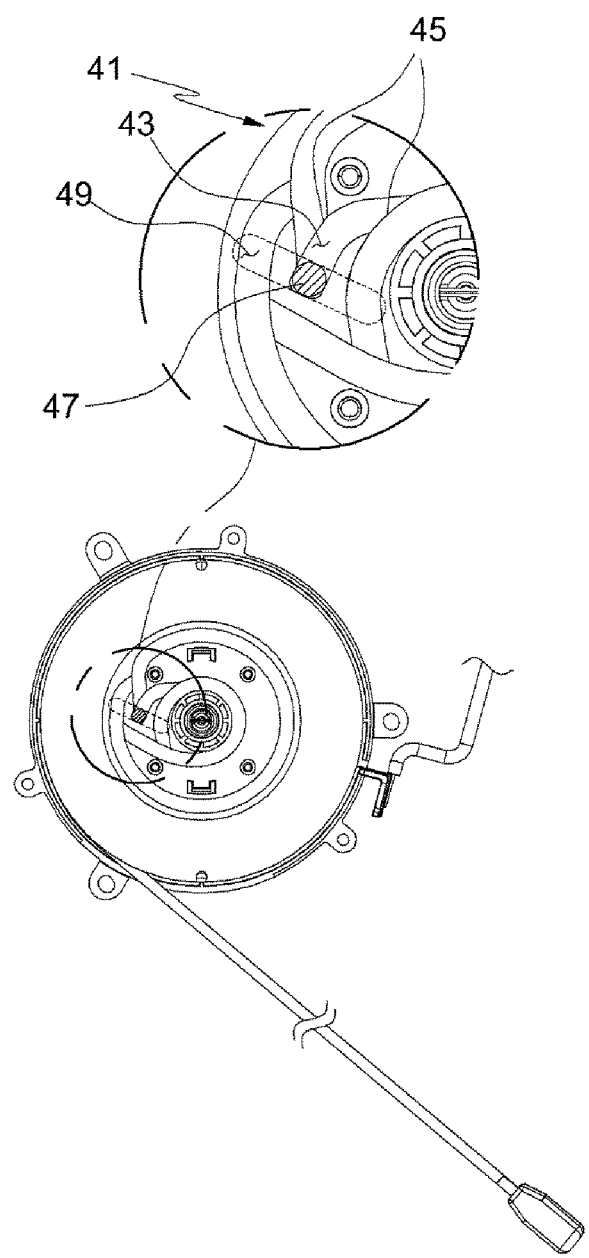
Figure 9C:
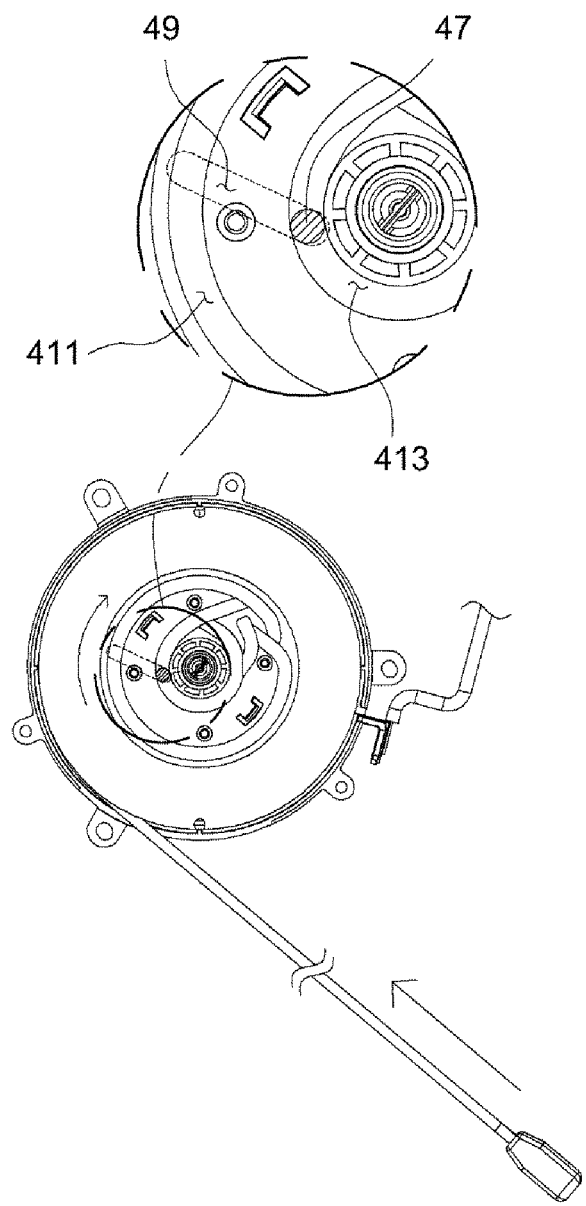

More specifically, as illustrated in FIGS. 9A, 9B, and 9C, the fixing ball 47 and the movement path 41 along which the fixing ball 47 moves are formed on the upper portion of the upper cover 21. The movement path 41 includes a winding path 411 along which the fixing ball 47 moves when the cable 15 is wound, an unwinding path 413 along which the fixing ball 47 moves when the cable 15 is unwound, and a connecting path 415 connecting the winding path 411 and the unwinding path 413 such that the fixing ball 47 can move from the winding path 411 to the unwinding path 413 through the connecting path 415 and vice versa.

Describing in more detail, the fixing ball 47 can alternately move along the winding path 411 and the unwinding path 413 along a movement recess 49 formed in the inner surface of the upper body 11. When the cable 15 is unwound, the fixing ball 47 staying in the winding path 411 moves along the connecting path 415 to the unwinding path 413 positioned outward of the winding path 411, and rotates along the unwinding path 413. When the cable 15 that has been unwound is released, the fixing ball 47 moves into the unwinding path 413 along the connecting path 415 connected to the unwinding path 413. Subsequently, the fixing ball 47 is seated in the fixing path 43 connected to a portion of the connecting path 415 such that the fixing ball 47 can be fixed in position.

When the cable 15 is slightly unwound in order to rewind the cable 15, the fixing ball 47 staying in the fixing path 43 moves to the connecting path 415 connected to the winding path 411 and subsequently is positioned in the winding path 411. As the fixing ball 47 moves along the winding path 411, the cable 15 can be properly wound.

It is preferable that anti-movement stepped portions 45 be disposed at the boundaries between the paths in order to limit the route along which the fixing ball 47 can move such that the fixing ball 47 properly moves in the sequence of the winding path 411, the unwinding path 413, the fixing path 43, and the winding path during the process of unwinding and rewinding the cable 15. The anti-movement stepped portions 45 allow the cable 15 to be smoothly unwound and rewound.

Although the cable-arranging assembly having the specific shape, structure, and configuration of the present invention has been described with reference to the accompanying drawings, a person skilled in the art will appreciate that various modifications, changes, and substitutions are possible. It should be understood that such modifications, changes, and substitutions fall within the scope and spirit of the invention as disclosed in the accompanying claims.

What is claimed is:

1. A cable arranging assembly comprising:
   a body (10) comprising an upper body (11) and a lower body (13) coupled to the upper body to define an accommodation space in the body;
   a winding unit (20) comprising a winding member (27) disposed in the accommodation space (131) to wind a cable (15), an upper cover (21) disposed over the winding member, and a lower disposed under the winding member, the lower cover (23) being coupled to the upper cover; and
   a connector unit (30) comprising a first earth part (31) connected to a main cable (17) disposed outside of the body (10) and a second earth part (33) connected to the cable (15),
   wherein the upper body (11) has a withdrawal/retraction hole and an earth through-hole in outer surfaces thereof, the cable (15) protruding outward from the body (10) through the withdrawal/retraction hole, and a first earth part provided on the connector unit protruding outward from the body through the earth through-hole,
   wherein the lower body (13) has an earth-fixing part in an outer surface thereof, the first earth part protruding through the first earth (31) through-hole being fixed by the earth-fixing part to be connected to the main cable (17), and
   wherein the second earth part (33) is provided on an earth connecting portion of the lower cover (23) to be connected to an earth terminal of the cable.

2. The cable arranging assembly according to claim 1, wherein the conductor unit (30) comprising a flexible conductor formed as a flexible printed circuit board, wherein one end of the flexible printed circuit board is connected to the cable (15) and the other end of the flexible printed circuit board is connected to the main cable (17).

3. The cable arranging assembly according to claim 1,
   wherein the winding unit (20) further comprises an elastic member (25) formed as a leaf spring imparting elasticity to the winding member (27),
   wherein the winding member (27) comprises a receptacle (273) accommodating the elastic member (25) and a winding protrusion (271) protruding upward along circumferences of the receptacle (273),
   wherein the receptacle (273) has a through-hole (273A) in a central portion thereof, through which a center protrusion (135) protruding from a central portion of the lower body (13) extends, and
   wherein the elastic member (25) comprises a first fixing portion (251) coupled to a coupling recess (271A) formed on the winding protrusion (271) and a second fixing portion (253) extending through the through-hole (273A) to be coupled to a fixing recess (135A) of the center protrusion (135).

4. The cable arranging assembly according to claim 1, wherein the body (10) comprises a fixing means (40) for fixing withdrawal and retraction of the cable, the fixing means (40) comprising:
   a fixing ball (47);
   a movement path (41) along which the fixing ball (47) moves; and
   a fixing path (43) provided on the movement path (41), such that the fixing ball (47) is fixed on the fixing path (43),
   wherein the movement path (41) comprises:
   a winding path (411) along which the fixing ball (47) moves when the cable (15) is wound;
   an unwinding path (413) along which the fixing ball (47) moves when the cable (15) is unwound; and
   a connecting path (415) connecting the winding path (411) and the unwinding path (413).

5. The cable arranging assembly according to claim 4, wherein anti-movement stepped portions (45) are provided at boundaries between the winding path (411), the unwinding path (413), and the fixing path (43).

6. The cable arranging assembly according to claim 2, wherein the body (10) comprises a fixing means (40) for fixing withdrawal and retraction of the cable, the fixing means (40) comprising:
- a fixing ball (47);
- a movement path (41) along which the fixing ball (47) moves; and
- a fixing path (43) provided on the movement path (41), such that the fixing ball (47) is fixed on the fixing path (43), wherein the movement path (41) comprises:
- a winding path (411) along which the fixing ball (47) moves when the cable (15) is wound;
- an unwinding path (413) along which the fixing ball (47) moves when the cable (15) is unwound; and
- a connecting path (415) connecting the winding path (411) and the unwinding path (413).

7. The cable arranging assembly according to claim 6, wherein anti-movement stepped portions (45) are provided at boundaries between the winding path (411), the unwinding path (413), and the fixing path (43).

8. The cable arranging assembly according to claim 3, wherein the body (10) comprises a fixing means (40) for fixing withdrawal and retraction of the cable, the fixing means (40) comprising:
- a fixing ball (47);
- a movement path (41) along which the fixing ball (47) moves; and
- a fixing path (43) provided on the movement path (41), such that the fixing ball (47) is fixed on the fixing path (43), wherein the movement path (41) comprises:
- a winding path (411) along which the fixing ball (47) moves when the cable (15) is wound;
- an unwinding path (413) along which the fixing ball (47) moves when the cable (15) is unwound; and
- a connecting path (415) connecting the winding path (411) and the unwinding path (413).

9. The cable arranging assembly according to claim 8, wherein anti-movement stepped portions (45) are provided at boundaries between the winding path (411), the unwinding path (413), and the fixing path (43).

* * * * *